(12) United States Patent
Weber et al.

(10) Patent No.: US 6,365,055 B1
(45) Date of Patent: Apr. 2, 2002

(54) PROCESS FOR PRODUCING A SENSOR MEMBRANE SUBSTRATE

(75) Inventors: Heribert Weber, Nuertingen; Steffen Schmidt, Reutlingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/320,402

(22) Filed: May 26, 1999

(30) Foreign Application Priority Data

May 30, 1998 (DE) .......................................... 198 24 401

(51) Int. Cl.$^7$ ............................................... H01L 29/84
(52) U.S. Cl. ..................... 216/2; 216/51; 73/504.04; 73/504.12; 73/777; 257/419; 257/452; 438/50
(58) Field of Search ............................. 73/1.15, 504.02, 73/504.03, 504.04, 504.12, 504.15, 504.17, 504.29, 504.36, 514.39, 777; 257/415, 416, 417, 419, 452, 457, 459, 466; 438/50, 51, 53, 55, 64; 216/2, 51

(56) References Cited

U.S. PATENT DOCUMENTS 5,362,575 A * 11/1994 Trimble ...................... 428/688
5,514,898 A * 5/1996 Hartauer ...................... 257/417
5,672,449 A * 9/1997 Loschner et al. .............. 430/5

FOREIGN PATENT DOCUMENTS

| DE | 3900526 A1 * | 7/1989 | ............ G03F/1/00 |
| DE | 42 15 722 | 11/1993 | |

* cited by examiner

*Primary Examiner*—Randy Gulakowski
*Assistant Examiner*—Allan Olsen
(74) *Attorney, Agent, or Firm*—Kenyon & Kenyon

(57) ABSTRACT

A process for producing a sensor membrane substrate, in particular, for a mass flow sensor or a pressure sensor, the substrate having on its front a membrane, which is fixed at the edge of an opening that is etched free from the back. The process includes the following steps: providing a substrate; local thickening the substrate in an area on the front opposite the edge, the thickened portion having a continuous transition to the substrate; depositing a membrane layer on the front having the locally oxidized area; and etching free the opening from the back to clear the membrane in such a way that the edge is located underneath the thickened area.

10 Claims, 2 Drawing Sheets

PROCESS FOR PRODUCING A SENSOR MEMBRANE SUBSTRATE

FIELD OF THE INVENTION

The present invention relates to a process for producing a sensor membrane substrate, in particular, for a mass flow sensor or a pressure sensor, the substrate having a membrane at its front, which is fixed at the edge of an opening that is etched free from the back.

BACKGROUND INFORMATION

Although applicable to the manufacture of any kind of sensor membrane substrates, the present invention as well as the underlying difficulty are explained with respect to a mass flow sensor, e.g., an air-mass flow sensor for use in automotive engineering, using silicon technology.

In the case of such a customary air-mass flow sensor, the air mass is measured thermoelectrically on such a thin dielectric membrane. The membrane is manufactured by depositing functional membrane layers on the front of the substrate (silicon wafer) and subsequently etching free the membrane area from the back.

FIG. 4 is a schematic representation of a customary sensor membrane substrate, illustrating the difficulty arising in the case of the usual sensor membrane substrate.

In FIG. 4, reference symbol 10 refers to a silicon substrate having a front VS and a back RS, 20 and 25 to membrane layers of $SiO_2$ and $Si_3N_4$, respectively, 50 to an opening etched from the back, R to an edge of opening 50 and 100 to the membrane, and A to a fixing area of membrane 100.

A disadvantage of the above known approach is that, due to the etching process, a crystallographically-inherent, sharp etching edge forms at the transition of the membrane/silicon substrate, i.e., at edge R. When pressure is exerted from front VS, a notch effect can arise at this etching edge which is so great that stress cracks can form in the individual membrane layers.

German Patent No. DE 42 15 722 suggests introducing additional doping areas on the front in the area of the edge. These are not etched during the anisotropic etching of the back to clear membrane 100, and are rounded during a re-etching process with an etching solution which etches silicon isotropically, in order to reduce the notch stress and increase the compressive strength. However, this procedure is costly from the standpoint of process technology, since it requires an additional doping step and etching step.

SUMMARY OF THE INVENTION

The process according to the present invention for producing a sensor membrane substrate has the advantage over the known approach, in that only one additional thickening step is necessary without requiring an additional etching step.

A basic idea of the present invention lies in locally thickening the substrate in an area on the front opposite the edge, the thickened portion having a continuous transition to the substrate. Subsequently, a membrane layer is deposited on the front having the locally thickened area. The rear etching edge is then placed under the thickened area.

Such a gentle, smooth transition can reduce the notch effects and the tendency to fracture in the fixing area when pressure is applied, and the stability of the membrane is increased, since the tensions are distributed more favorably in the fixing area of the membrane. No stress cracks appear any longer, and the compressive strength is decisively improved.

According to a preferred embodiment, the step of local thickening includes the following steps: depositing and patterning of a masking layer on the front of the substrate to lay bare the area opposite the edge and local oxidizing of the area. The beak-shaped transitions during local oxidizing are excellently suited for making an even transition between the thickened and the unthickened area. Furthermore, the local oxidation of silicon is a process which can be well controlled.

According to a further preferred embodiment, prior to the local oxidation, a lower membrane sublayer is made by oxidizing the substrate, and subsequently, the thickening is performed in the lower membrane sublayer. However, it is absolutely possible to omit this membrane sublayer.

According to a further preferred embodiment, the masking layer is removed prior to depositing a membrane layer on the front. This is done if the intention is not to embed the masking layer in the membrane. However, such an incorporation or the incorporation after a conversion (e.g., returning a nitride layer into an oxide layer) is possible.

According to a further preferred embodiment, the substrate is a silicon substrate.

According to another preferred embodiment, the masking layer is a nitride layer.

According to a further preferred embodiment, the masking layer is also used for masking the back during the etching of the opening. Thus, this layer can have a dual function.

According to yet another preferred embodiment, the locally oxidized area, except for the membrane area, is located on the remaining substrate.

DETAILED DESCRIPTION

In the Figures, identical parts or parts having identical functions are provided with identical reference symbols.

Figure 1:
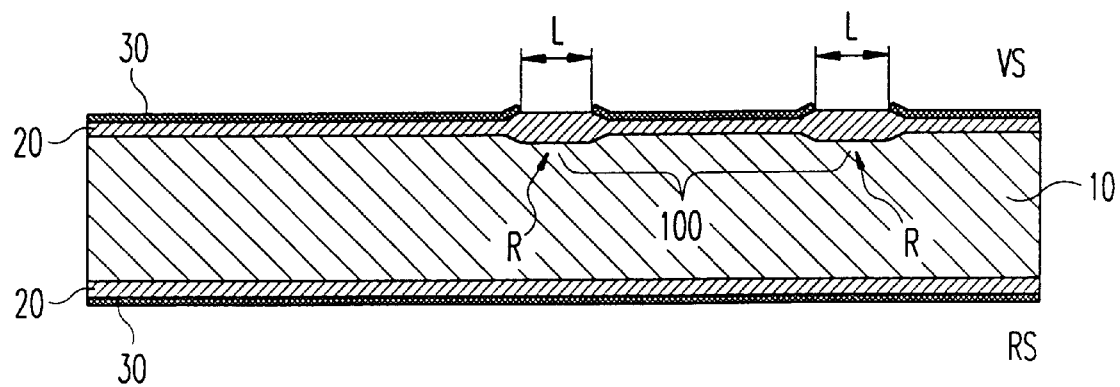
FIG. 1 shows a schematic representation of a stage in the production of a sensor membrane substrate to illustrate an exemplary embodiment of the process according to the present invention.

FIG. 1 is a schematic representation of a stage in the production of a sensor membrane substrate to explain an exemplary embodiment of the process according to the present invention.

In FIG. 1, in addition to the already introduced reference symbols, reference symbol 30 refers to a nitride layer and L to a thickened area, i.e., here to an area for a local oxidation.

In the exemplary embodiment of the process according to the present invention for producing a sensor membrane substrate, the essential steps in the course of the process are carried out as follows:

Substrate 10, in this case, is a silicon substrate.

Then, an oxide layer 20 is produced on the front VS and the back RS (lower membrane sublayer 20 on front VS) by oxidizing substrate 10. Subsequently, the nitride layer 30 is deposited as a masking layer on front VS and back RS of substrate 10, followed by a photolithographic patterning on front VS for laying bare area L opposite future edge R of rear opening 50. After that, area L is locally oxidized, area L being, for example, a circular ring in the case of a circular membrane 100. Due to the local oxidation, oxidated area L forms in the characteristic shape of a beak.

Figure 2:
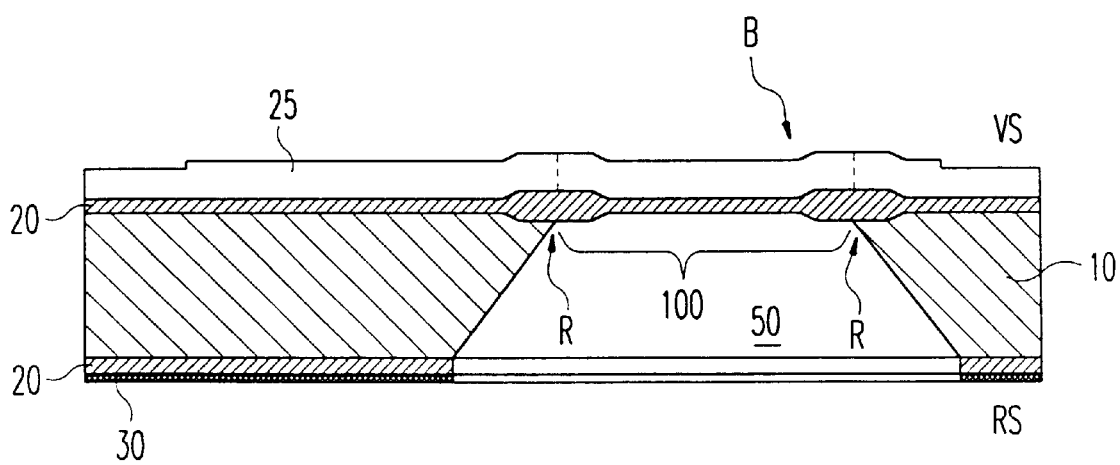
FIG. 2 shows a schematic representation of a further stage in the production of a sensor membrane substrate to illustrate an exemplary embodiment of the process according to the present invention.

FIG. 2 is a schematic representation of a further stage in the production of a sensor membrane substrate to explain an exemplary embodiment of the process according to the present invention.

To reach the production stage shown in FIG. 2, nitride layer 30 is removed from front VS, and membrane layer 25 is subsequently deposited on front VS having membrane sublayer 20 including locally thickened area L.

Then, opening 50 is etched free from back RS to clear membrane 100 in such a way that edge R is located underneath thickened area L, nitride layer 30, which was previously patterned correspondingly, being used for masking back RS during the etching of opening 50.

Figure 3:
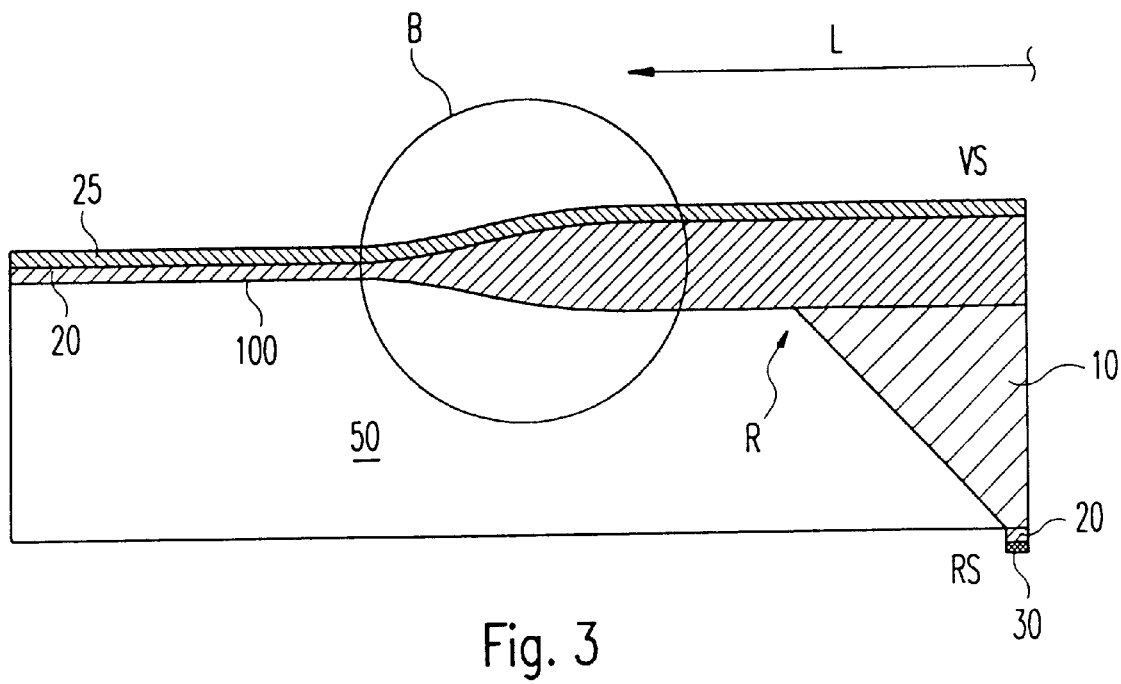
FIG. 3 shows an enlarged representation of the edge area B of FIG. 2.
Figure 4:
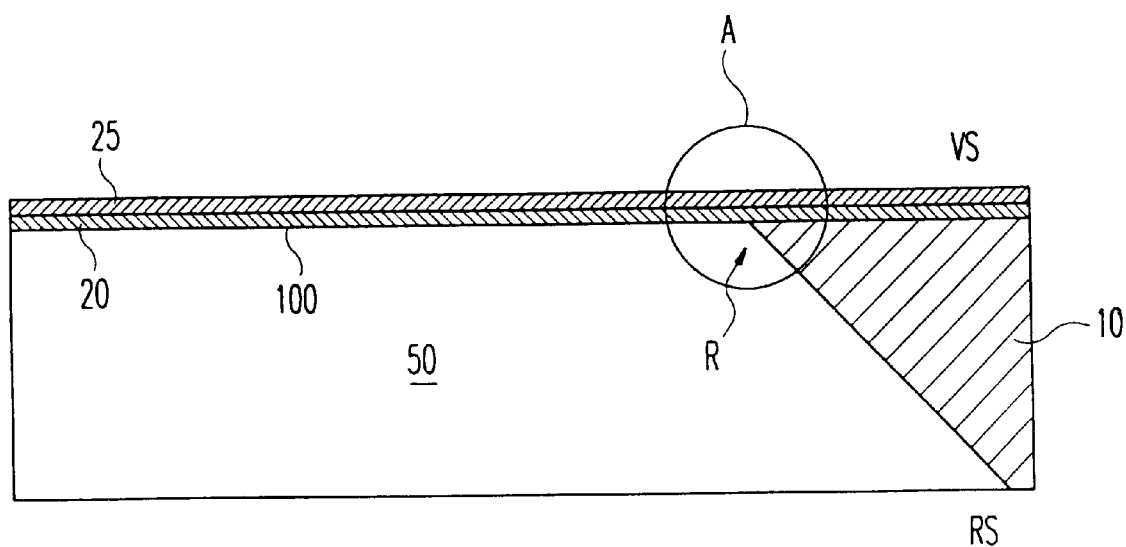
FIG. 4 shows a schematic representation of a customary sensor membrane substrate to explain the underlying difficulty.

FIG. 3 is an enlarged representation of the edge area B of FIG. 2. In FIG. 3, the beak-shaped form of the edge of the locally oxidized area L is clearly visible. This beak-shaped form produces a gentle, i.e., smooth transition to the thickened area, thereby effectively reducing the notch effect.

Although the present invention has been explained above on the basis of a preferred exemplary embodiment, it is not limited to it, but is capable of being modified in many ways.

In particular, the materials of the substrate and the layers deposited thereon are indicated only by way of example and may be replaced by other materials which are suited accordingly.

Finally, the geometry of the membrane is not limited to the indicated circular form, but may have any other form.

LIST OF REFERENCE SYMBOLS

| | |
|---|---|
| 10 | substrate |
| VS, RS | front, back of 10 |
| 20 | oxide layer |
| 25 | membrane layer |
| 30 | nitride layer |
| 50 | opening |
| A | fixing area having a notch effect |
| B | fixing area without notch effect |
| R | edge of 50 |
| 100 | membrane |
| L | area for local oxidation |

What is claimed is:

1. A process for producing a sensor membrane substrate having a front side, a back side and a membrane on the front side, the membrane being fixed at an edge of an opening etched free from the back side, comprising the steps of:

locally thickening a layer of the substrate in an area on the front side opposite the edge, the thickened area having a continuous transition to an area of the layer of the substrate where the layer of the substrate is not thickened;

depositing a membrane layer on the layer of the substrate, the layer of the substrate and the membrane layer forming the membrane; and etching free the opening from the back side to clear the membrane such that the edge is situated underneath the thickened area.

2. The process according to claim 1, wherein the substrate is part of a sensor for measuring at least one of a mass flow and a pressure.

3. The process according to claim 1, wherein the thickening step includes the steps of:

depositing and patterning a masking layer on the front side of the layer of the substrate to lay bare the area opposite the edge; and locally oxidizing the area.

4. The process according to claim 3, further comprising the step of oxidizing the substrate to form the layer of the substrate.

5. The process according to claim 3, further comprising the step of removing the masking layer prior to depositing the membrane layer on the front side.

6. The process according to claim 1, wherein the substrate is composed of silicon.

7. The process according to claim 3, wherein the masking layer is a nitride layer.

8. The process according to claim 3, further comprising the step of depositing and patterning a further masking layer on the back side of the substrate such that the masking layer masks the back side during the etching of the opening.

9. The process according to claim 3, wherein the locally oxidized area, except for a membrane area, is located on the substrate.

10. The process according to claim 3, wherein the substrate is oxidized to form the layer of the substrate prior to locally oxidizing the area, and wherein the thickening is implemented in the layer of the substrate.

\* \* \* \* \*